United States Patent
Koorapaty et al.

(10) Patent No.: US 9,780,931 B2
(45) Date of Patent: Oct. 3, 2017

(54) FLEXIBLE TRANSMISSION OF MESSAGES IN A WIRELESS COMMUNICATION SYSTEM

(75) Inventors: Havish Koorapaty, Saratoga, FL (US); Robert Baldemair, Solna (SE); Jung-Fu Cheng, Fremont, CA (US); Mattias Frenne, Uppsala (SE); Daniel Larsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 13/494,040

(22) Filed: Jun. 12, 2012

(65) Prior Publication Data
US 2013/0044834 A1    Feb. 21, 2013

Related U.S. Application Data

(60) Provisional application No. 61/523,540, filed on Aug. 15, 2011.

(51) Int. Cl.
*H04L 27/00* (2006.01)
*H04L 5/00* (2006.01)
(Continued)

(52) U.S. Cl.
CPC .......... *H04L 5/0048* (2013.01); *H04L 5/0026* (2013.01); *H04L 5/0053* (2013.01); *H04L 27/2611* (2013.01); *H04L 25/0204* (2013.01); *H04L 25/0228* (2013.01)

(58) Field of Classification Search
USPC ................................................ 375/295, 265
See application file for complete search history.

(56) References Cited

U.S. PATENT DOCUMENTS 8,498,254 B2    7/2013  Dai et al.
2009/0209256 A1*  8/2009  Nakashima ....... H04W 36/0088
                                                            455/436
(Continued)

FOREIGN PATENT DOCUMENTS

JP    2010219817 A    9/2010
WO   2010090415 A2    8/2010
(Continued)

OTHER PUBLICATIONS

Dahlman et al. 4G LTE/LTE-Advanced for mobile Broadband, Mar. 2011, Academic Press Elsevier.*
(Continued)

*Primary Examiner* — Wednel Cadeau
(74) *Attorney, Agent, or Firm* — Rothwell, Figg, Ernst & Manbeck, P.C.

(57) ABSTRACT

Devices and methods for transmitting information in resource blocks between a base station and one or more communication devices are disclosed. In each resource block (RB) used for a data or control channel transmission, a plurality of non-overlapping regions of resource elements (REs) are defined. Each region is associated with one or multiple unique reference symbols (RSs). When user equipment (UE) demodulates the information it receives in a particular region of a resource block (RB), it uses the reference symbol (RS) associated with that region. The reference symbol (RS) information may be used, for example, to estimate a channel of the communication network or to demodulate and decode the data contained within the associated regions.

26 Claims, 14 Drawing Sheets

(51) Int. Cl.
*H04L 27/26* (2006.01)
*H04L 25/02* (2006.01)

(56) References Cited

U.S. PATENT DOCUMENTS

| | | | |
|---|---|---|---|
| 2010/0103901 A1* | 4/2010 | Miki | H04L 1/0003 370/330 |
| 2011/0176634 A1* | 7/2011 | Yoon | H04L 5/0023 375/295 |
| 2011/0268072 A1 | 11/2011 | Lee et al. | |
| 2012/0014320 A1 | 1/2012 | Nam et al. | |
| 2012/0106501 A1 | 5/2012 | Kishiyama et al. | |
| 2012/0243500 A1 | 9/2012 | Chandrasekhar et al. | |
| 2012/0263117 A1 | 10/2012 | Love et al. | |
| 2013/0003604 A1 | 1/2013 | Blankenship et al. | |
| 2013/0129018 A1 | 5/2013 | Ko et al. | |

FOREIGN PATENT DOCUMENTS

| | | | |
|---|---|---|---|
| WO | 2011041623 A1 | 4/2011 | |
| WO | 2011079454 A1 | 7/2011 | |
| WO | 2011136523 A2 | 11/2011 | |
| WO | 2013024434 A1 | 2/2013 | |

OTHER PUBLICATIONS

Dahlman et al., 4G LTE/LTE-Advanced for Mobile Broadband, Mar. 2011, Academic Press Elsevier.*

Notification of Transmittal of the International Search Report and the Written Opinion of the International Searching Authority, or the Declaration, dated Dec. 7, 2012, 13 pages.
Dahlman et al. "4G LTE/LTE-Advanced for Mobile Broadband—Chapter 10" Mar. 29, 2011, XP055046016, 61 pages.
Final Office Action dated Apr. 3, 2014, U.S. Appl. No. 13/430,865, filed Mar. 27, 2012, Inventor(s): Havish Koorapaty et al., 28 pages.
Non-final Office Action U.S. Appl. No. 13/430,865, mailed Aug. 13, 2013, 27 pages.
Response filed to non-final Office Action U.S. Appl. No. 13/430,865, filed in the U.S. Patent and Trademark Office on Dec. 12, 2013, 20 pages.
International Search Report for International application No. PCT/IB2012/054148, mailed Dec. 7, 2012, 3 pages.
International Preliminary Report on Patentability, in corresponding International Application No. PCT/IB2012/054141, dated Feb. 18, 2014, 7 pages.
First Office Action in corresponding Chinese patent application No. 201280050682.6 dated May 17, 2016, 4 pages.
Japanese Office Action dated Feb. 28, 2016, issued in Japanese Patent Application No. 2014-525547, 6 pages.
ZTE "Aspects on DL control signaling enhancements" 3GPP TSG-RAN WG1 #65, R1-111521, 2011, 5 pages.
Nokia et al. "On enhanced downlink control signalling for Rel-11" 3GPP TSG RAN WG1 Meeting #65, R1-111743, 2011, 4 pages.
Second Office Action dated Jan. 20, 2017, issued in Chinese Patent Application No. 201280050682.6, 3 pages.

* cited by examiner

FLEXIBLE TRANSMISSION OF MESSAGES IN A WIRELESS COMMUNICATION SYSTEM

CROSS-REFERENCE TO RELATED APPLICATIONS

The present application claims priority benefit under 35 U.S.C. §119(e) of U.S. Provisional Patent Application No. 61/523,540, entitled "Flexible Transmission Of Messages In A Wireless Communication System," filed Aug. 15, 2011, the contents of which are incorporated herein by reference in their entirety.

TECHNICAL FIELD

The present invention relates generally to telecommunication networks, and more particularly, to a method and device for transmitting data in a wireless communication network.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels. In LTE, transmissions are sent from base stations, such as Node Bs (NBs) and evolved Node Bs (eNBs), to mobile stations (e.g., user equipment (UE)). These transmissions are sent using orthogonal frequency division multiplexing (OFDM), which splits the signal into multiple parallel sub-carriers in frequency.

As illustrated in FIG. 1, the basic unit of a transmission in LTE is a resource block (RB) 100, which in its most common configuration consists of 12 sub-carriers 104 and 7 OFDM symbols 108 (i.e., one slot). An OFDM symbol 108 may include a cyclic prefix 106. A unit of one sub-carrier and one OFDM symbol is referred to as a resource element (RE) 102. Thus, an RB may consist of, for example, 84 REs in a 12×7 configuration.

An LTE radio sub-frame may be composed of multiple resource blocks in frequency and two slots in time, with the number of RBs determining the bandwidth of the system. Two RBs in a sub-frame, that are adjacent in time, for instance as shown in FIG. 3, may be referred to as an RB pair 300. In the time domain, an LTE downlink transmission may be organized into radio frames of 10 ms, each radio frame consisting of ten equally-sized sub-frames of length $T_{sub-frame}$=1 ms.

An LTE communication network, for instance, as illustrated in FIG. 5, may be deployed in a number of configurations. In certain configurations, a base station 502, such as an eNB, and user equipment 504 are in communication. When a signal is transmitted by the eNB 502 in a downlink, i.e., the link carrying transmissions from the eNB to the UE 504, a sub-frame may be transmitted from multiple antennas. The signal may be received at a UE 504, which has one or more antennas. The radio channel distorts the transmitted signals from the multiple antenna ports.

Due to the multiple paths and conditions on each channel, in order to demodulate a transmission on the downlink, the UE 504 relies on reference symbols (RS) that are also transmitted on the downlink. A reference symbol may be understood as one or more REs carrying pre-defined symbols. These reference symbols and their position in the time-frequency grid are known, or otherwise determined, by the UE. Thus, the RSs can be used to determine channel estimates by measuring the effect of a specific radio channel on these symbols.

According to the LTE standard, transmissions from an eNB are sent from "antenna ports" rather than antennas. An antenna port may be understood as a virtual antenna, which can further be associated with a reference symbol RS. Thus, when a UE measures the channel from an antenna port to the receiver antenna, which physical antenna elements were used for the transmission is irrelevant for the UE. The transmission on an antenna port may originate from a single physical antenna element or may be the combination of signals from multiple antenna elements.

In certain instances, the use of transmit pre-coding can be used to direct transmitted energy towards a specific receiving UE. This may be accomplished by using all available antenna elements to transmit the same message, with different phase and/or amplitude weights applied at each antenna element. Since the reference symbol associated with each antenna port also undergoes the same pre-coding operation with identical pre-coding weights as the data, the transmission uses a single virtual antenna/single antenna port, and the UE need only perform channel estimation using a single RS.

There are several broad types of RSs used in LTE. A first type of RS is one that can be used by all UEs, and thus, have wide cell area coverage. One example of this type of RS is the common reference symbol (CRS) that is used by UEs for various purposes, including channel estimation. Presently, these CRSs are defined so that they occupy certain pre-defined REs within the transmission sub-frame, regardless of whether there is any data being sent to users or not. For example, as shown in FIG. 2, a sub-frame 200 may include a control region, control signaling, and reference symbols 202. Reference symbol 202 may be a CRS used by a UE in the communication network.

A second type of RS is a UE-specific reference symbol, which is intended specifically for use by only a certain UE or set of UEs. Presently, these UE-specific RSs are transmitted only when data is transmitted to a certain UE. When pre-coded for a specific UE or set of UEs, the RS does not reach all parts of the cell, but rather only those parts of the cell where the UEs of interest (i.e., the intended data recipients) are located.

In LTE, UE-specific RS are included as part of the RBs that are allocated to a UE for reception of user data. The exemplary use of UE-specific RSs in LTE is shown in the RB pair of FIG. 3, which includes UE-specific RSs $R_7$ and $R_9$.

Further, messages transmitted over a radio link to UEs in an LTE network can be broadly classified as control messages or data messages. Control messages are used to facilitate the proper operation of the system, as well as proper operation of each UE within the system. Control messages could include, for example, commands to control functions, such as transmitted power or other additional signaling within RBs. Examples of control messages include, but are not limited to, the physical control format indicator channel (PCFICH) which carries configuration information of the control region size; the physical downlink control channel (PDCCH) which, for example, carries scheduling information and power control messages; the physical HARQ indicator channel (PHICH), which carries ACK/NACK in response to a previous uplink transmission; and the physical broadcast channel (PBCH), which carries system information.

In LTE Rel-10, control messages are demodulated using the CRS. The first one to four OFDM symbols, depending on the configuration, in a sub-frame are reserved for control information, for instance as shown in FIG. 2. Control messages of PDCCH type are transmitted in multiples of units called control channel elements (CCEs), where each CCE contains 36 REs.

Presently, data messages may be transmitted to users in RBs, which carry UE-specific RSs. These RSs may be used by the UEs to demodulate the data messages. The use of UE-specific RSs allows a multi-antenna eNB to optimize the transmission using pre-coding of signals being transmitted from the multiple antennas so that the received signal becomes stronger at the UE and, consequently, the data rate of the transmission can be increased.

Similarly, Rel-10 of LTE also defines a control channel called the R-PDCCH for transmitting control information to relay nodes. The relay node receiving the R-PDCCH can use relay node (RN) specific reference signals to improve link performance. Adoption of the same principle of transmission as used for the R-PDCCH has been considered by allowing the transmission of generic control messages to a UE using such transmissions based on UE-specific RSs.

A problem with existing LTE systems is that there is no effective way to transmit common control signals in a manner such that they may be demodulated using UE-specific RSs and, thus, can realize the benefits that come with using UE-specific RSs. For instance, the ability to turn them off when no data is transmitted, which could improve power efficiency and interference reduction, and allow for the number of RSs used to scale with the number of resources being used for control message transmission.

A further problem exists regarding how to achieve diversity for small control channel messages, such as PDCCH of a single CCE or a PHICH, when using UE specific RS transmissions.

Also, there is not presently a way to allow transmission of control messages to UEs in bandwidths that may be different for different UEs.

Accordingly, there is a need for a method and device for improving transmission techniques from a base station to a UE using reference symbols.

SUMMARY

Particular embodiments of the present invention are directed to devices and methods for transmitting and receiving data in a wireless communications network using resource blocks that include a plurality of regions associated with one or more reference symbols.

According to certain aspects of the disclosed devices and methods, information is transmitted in resource blocks (RBs) between a base station and one or more communication devices. In each RB used for a data or control channel transmission, a plurality of non-overlapping regions of resource elements (REs) are defined. Each region is associated with one or multiple unique reference symbols (RSs). When user equipment (UE) demodulates the information it receives in a particular region of an RB, it uses the RS associated with that region. The RS information may be used, for example, to estimate a channel of the communication network or to demodulate and decode the data contained within the associated regions.

In one particular aspect, a method is provided for transmitting data in a resource block from a base station to a communication device. The transmitted resource block includes a plurality of regions made up of resource elements. The method includes allocating a first portion of the data to a first region of the resource block, which is associated with a first reference symbol, and allocating a second portion of the data to a second region of the resource block, which is associated with a second reference symbol. The method further includes encoding the first portion of data to generate first encoded data and encoding the second portion of the data to generate second encoded data. The encoded data is modulated to generate modulated data, which is transmitted in the resource block, along with the reference symbols, to the communication device.

Particular embodiments of the present invention provide a base station device operable in a communication network for transmitting data in a resource block, where the resource block includes a plurality of regions made up of resource elements. The base station includes a processor configured to allocate a first portion of the data to a first region of the resource block, which is associated with a first reference symbol. The processor is also configured to allocate a second portion of the data to a second region of the resource block, which is associated with a second reference symbol. The processor is further configured to encode the first and second portions of data to generate encoded data. The encoded data is then modulated by the processor and transmitted by a transmitter configured to transmit the modulated data, along with the first and second reference symbols, in the resource block.

In another aspect, particular embodiments of the present invention provide a method for demodulating data in a resource block that includes a plurality of regions comprising resource elements. The method includes receiving the data at a communication device from a base station of a communication network, where a first portion of the data has been allocated to a first region of the resource block and associated with a first reference symbol, and a second portion of the data has been allocated to a second region of the resource block and associated with a second reference symbol. The method also includes estimating a first channel of the communication network using the first reference symbol and estimating a second channel of the communication network using the second reference symbol. Finally, the method includes demodulating at least one of the first or second data portions.

Particular embodiments of the present invention provide a communication device operable in a communication network to receive data in a resource block, which includes a plurality of regions made up of resource elements. The data is received from a base station. According to particular aspects, a first portion of the data has been allocated to a first region of the resource block and associated with a first reference symbol, while a second portion of the data has been allocated to a second region of the resource block and associated with a second reference symbol. The communication device includes one or more antennas configured to receive the data, and a processor coupled to the antennas. The processor is configured to estimate a first channel of the communication network using the first reference symbol, and further to estimate a second channel of the communication network using the second reference symbol. The processor is also configured to demodulate at least one of the first or second portions of data.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

In exemplary embodiments of the disclosed devices and methods, data is transmitted in resource blocks between a base station and one or more communication devices.

Figure 5:
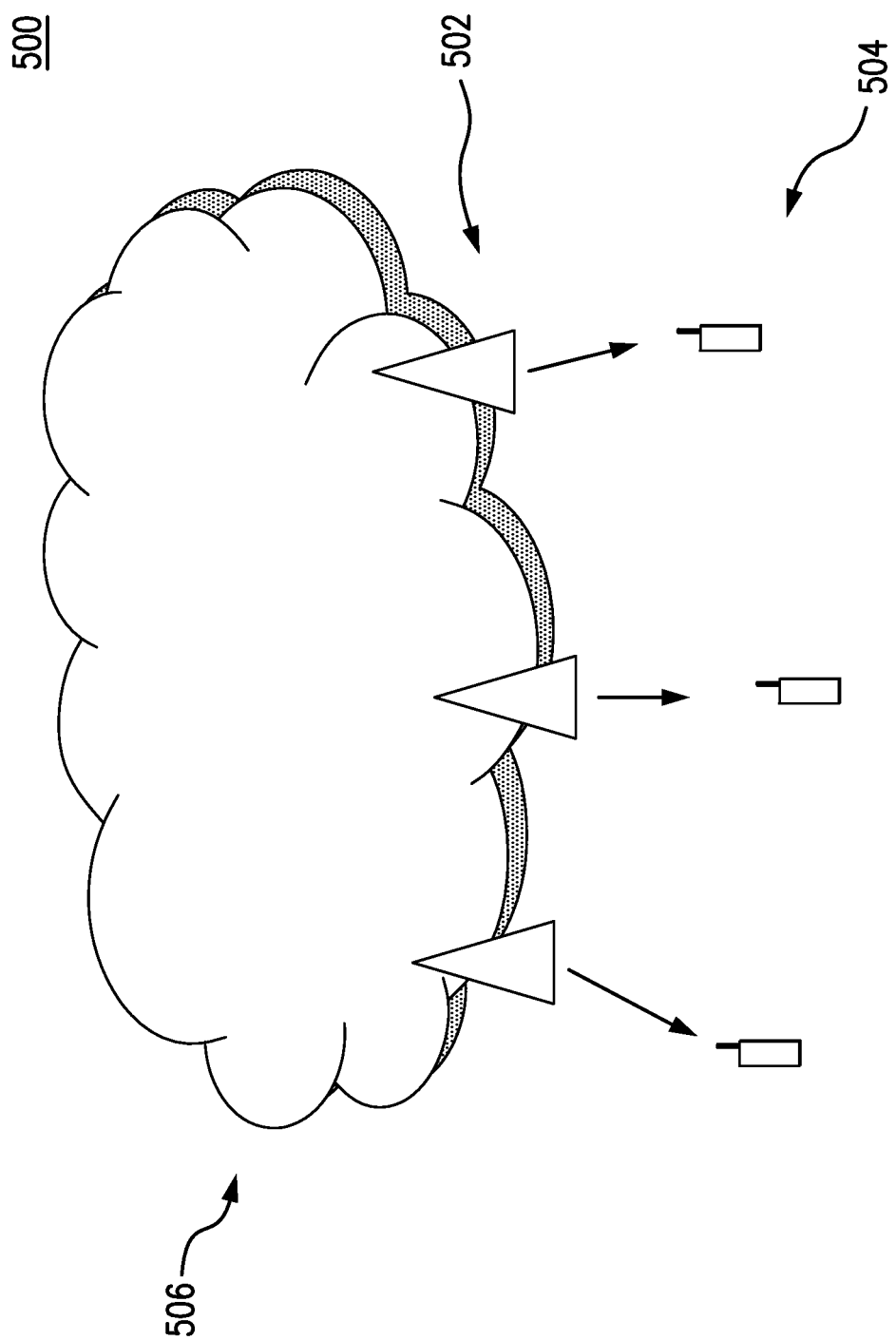
FIG. 5 illustrates a wireless communication system.

FIG. 5 illustrates an example wireless network 500. As shown, wireless network 500 includes at least one base station 502 and at least one wireless user equipment (UE) communication device 504, interconnected via a network 506. Examples of wireless UE communication devices include mobile telephones, personal digital assistants, electronic readers, portable electronic tablets, personal computers, and laptop computers.

Figure 6:
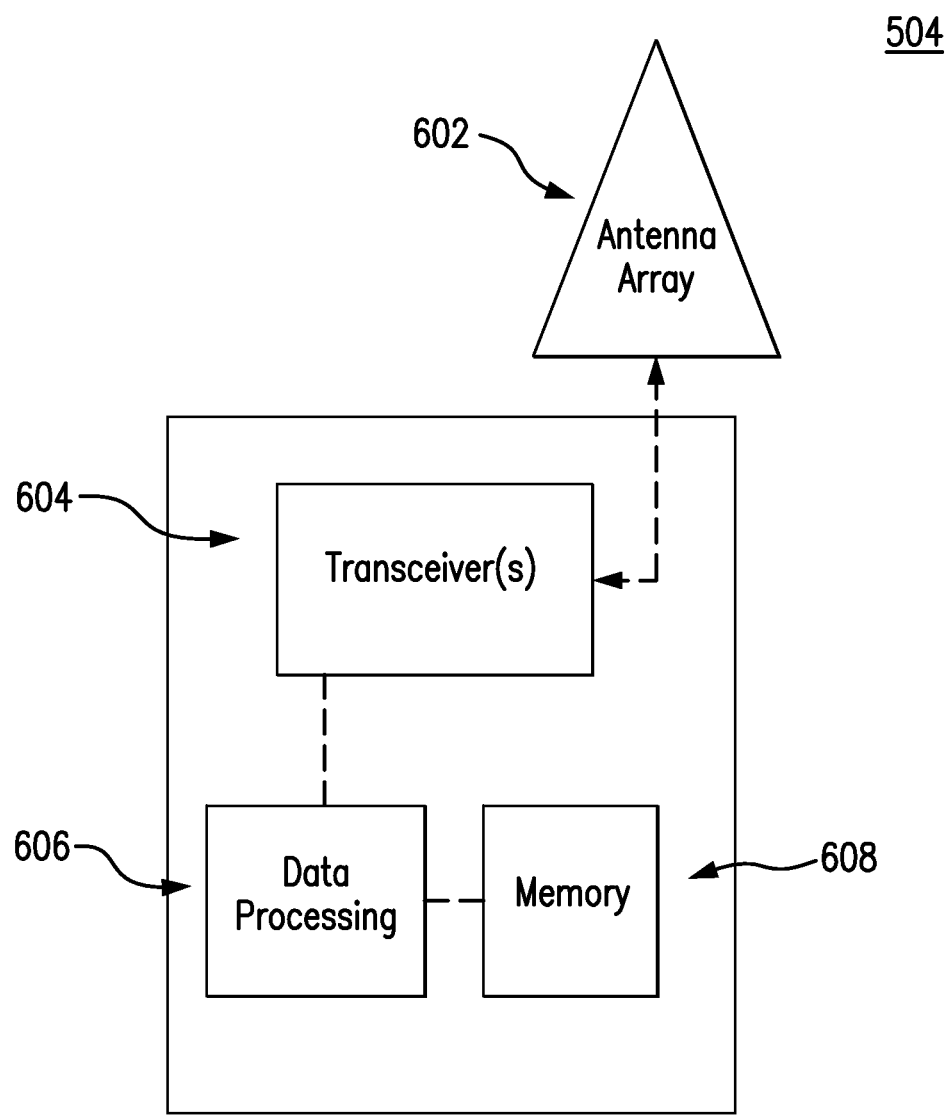
FIG. 6 is a block diagram of a UE communication device in accordance with exemplary embodiments of the present invention.

FIG. 6 illustrates a block diagram of an exemplary UE communication device 504. As shown in FIG. 6, the UE communication device 504 may include: an antenna array 602, which includes one or more antennas, a data processing system 606, which may include one or more microprocessors and/or one or more circuits, such as an application specific integrated circuit (ASIC), field-programmable gate arrays (FPGAs), or the like, and a data storage or memory system 608, which may include one or more non-volatile storage devices and/or one or more volatile storage devices (e.g., random access memory (RAM)). The antenna array 602 is connected to transceiver 604, which is configured to transmit and receive signals via the antenna array 602.

In embodiments where data processing system 606 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 606 to perform steps described below (e.g., steps described below with reference to the flow chart shown in FIG. 10). In other embodiments, the UE communication device 504 is configured to perform steps described above without the need for code. That is, for example, data processing system 606 may consist of one or more ASICs. Hence, the features described above may be implemented in hardware and/or software. For example, in particular embodiments, the functional components of the UE communication device 504 described above may be implemented by data processing system 606 executing computer instructions, by data processing system 606 operating independent of any computer instructions, or by any suitable combination of hardware and/or software.

Figure 7:
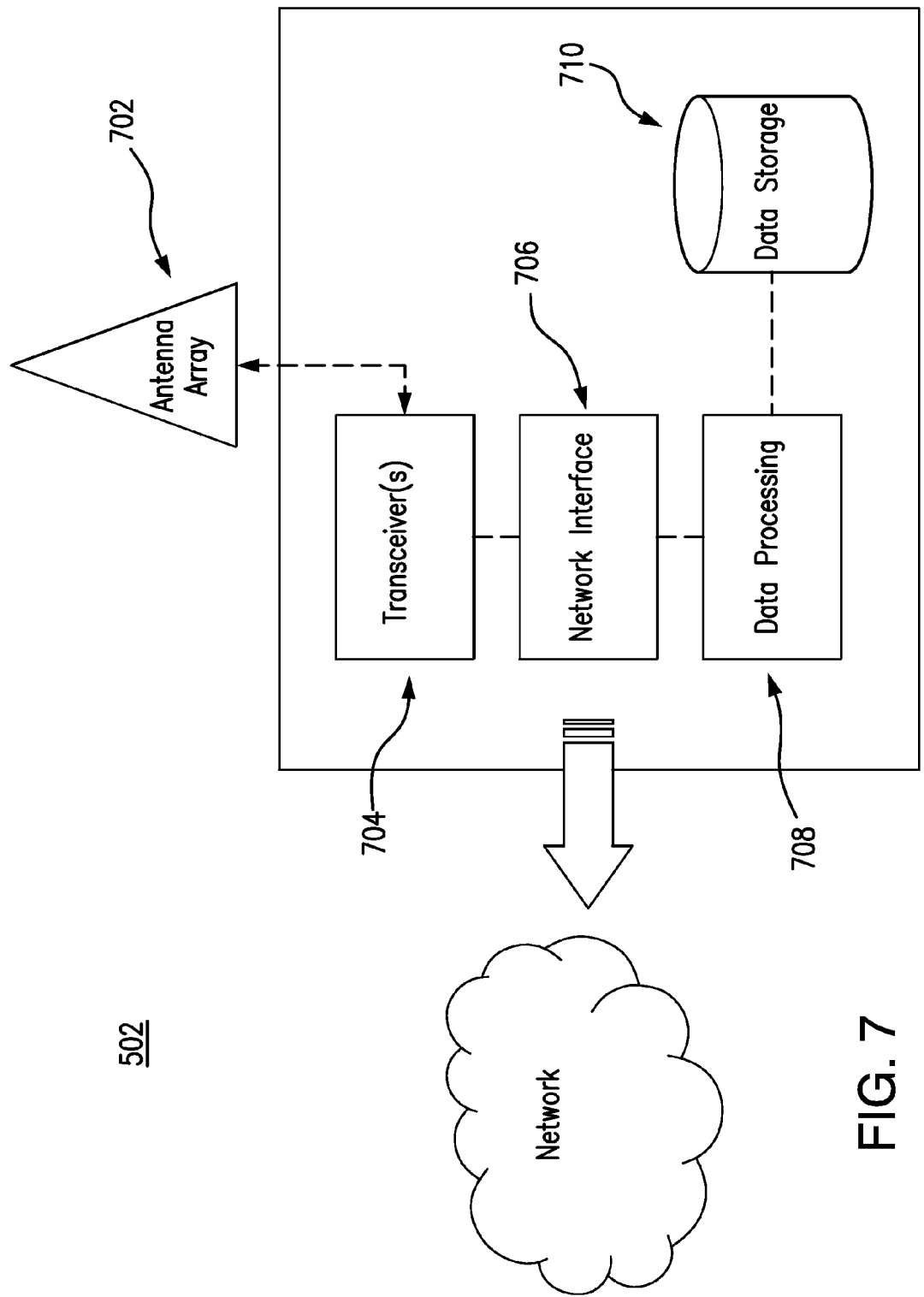
FIG. 7 is a block diagram of a base station in accordance with exemplary embodiments of the present invention.

FIG. 7 illustrates a block diagram of an exemplary base station 502. As shown in FIG. 7, the base station 502 may include: a data processing system 708, which may include one or more microprocessors and/or one or more circuits, such as an application specific integrated circuit (ASIC), field-programmable gate arrays (FPGAs), and the like; a network interface 706; and a data storage system 710, which may include one or more non-volatile storage devices and/or one or more volatile storage devices (e.g., random access memory (RAM)). The network interface 706 is connected to transceiver 704, which is configured to transmit and receive signals via an antenna array 702. According to particular embodiments of the present invention, the antenna array may be configured to include one or more antenna ports. For instance, antenna array 702 may include a first antenna port 0, and a second antenna port 1, which correspond to ports 0 and 1 of the LTE specification. In an exemplary embodiment of the disclosed devices and methods, the base station 502 is a Node B or Evolved Node B.

In embodiments where data processing system 708 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 708 to perform steps described below (e.g., steps described below with reference to the flow chart shown in FIG. 8). In other embodiments, the base station 502 is configured to perform steps described above without the need for code. That is, for example, data processing system 708 may consist merely of one or more ASICs. Hence, the features described above may be implemented in hardware and/or software. For example, in particular embodiments, the functional components of the base station described above may be implemented by data processing system 708 executing computer instructions, by data processing system 708 operating independent of any computer instructions, or by any suitable combination of hardware and/or software.

According to particular embodiments of the present invention, data may be transmitted in resource blocks (RBs) between a base station 502 and one or more communication devices 504. In certain aspects, within each RB used for a data or control channel transmission a plurality of non-overlapping regions of resource elements (REs) are defined. Each region is associated with at least one unique reference symbol (RS).

When user equipment 504 demodulates the information it receives in a particular region of an RB, it uses the RS and/or antenna port associated with that region. The RS and/or antenna port information may be used, for example, to estimate a channel of the communication network or to demodulate the data contained within the associated regions.

Figure 4:
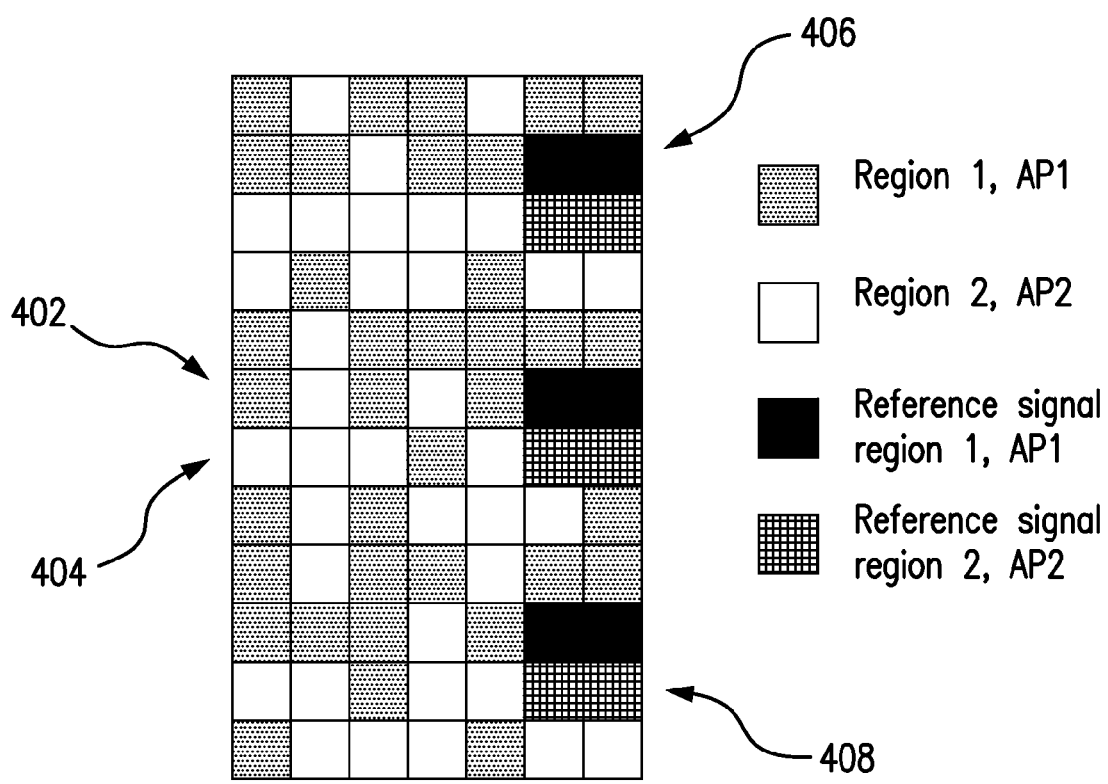
FIG. 4 illustrates a resource block with regions in accordance with exemplary embodiments of the present invention.

FIG. 4 illustrates an exemplary resource block consisting of two time-frequency regions 402, 404, where each region has a reference symbol associated with it. The first region 402 is associated with a first reference symbol transmitted in a resource element located in a first reference signal region 406. The second region 404 is associated with a second reference symbol transmitted in a resource element located in a second reference signal region 408. Each region can be used, for example, to transmit control information, such as a CCE, a PHICH, or a PBCH, or fractions of such messages elements.

Figure 8:
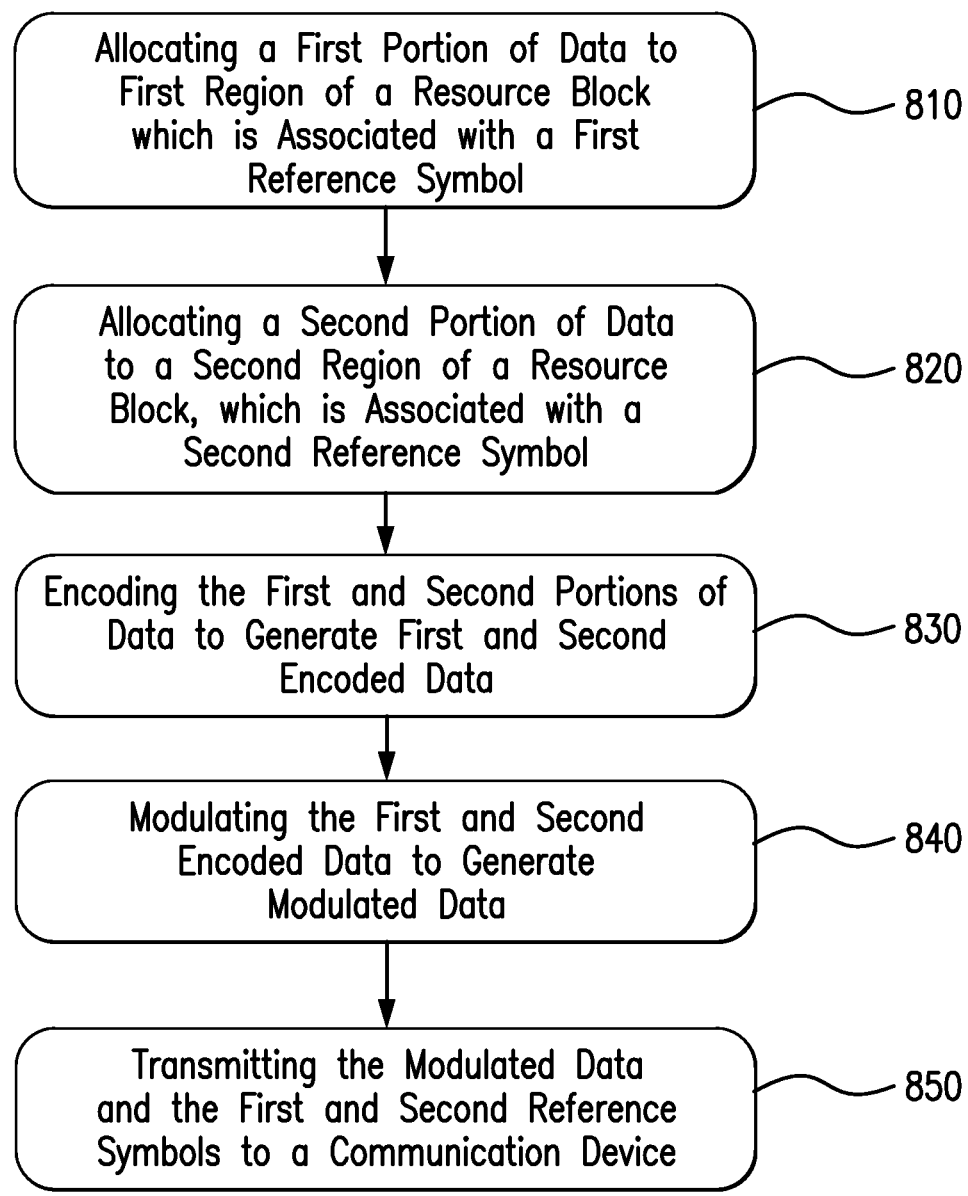
FIG. 8 is a flow chart illustrating a process for transmitting data in accordance with exemplary embodiments of the present invention.

Referring now to FIG. 8, a flow chart 800 illustrating a process for transmitting data in a resource block 400 from a base station 502 to a communication device 504 is shown. The resource block 400 includes multiple data regions, such as, regions 402 and 404 illustrated in FIG. 4.

In the first step of the process 810, a first portion of the data is allocated to a first region 402 of the resource block 400. This data is associated with a first reference symbol 406. The data may be, for example, a control message. According to aspects of the embodiment, the control message may include commands related to power control, scheduling information, ACK/NACK response, and/or system information. Furthermore, the first reference symbol 406 may be a UE-specific reference symbol.

In step 820, a second portion of the data is allocated to a second region 404 of the resource block 400. This data is associated with a second reference symbol 408. As with the first data, this data may be, for example, a control message and may include commands related to power control, scheduling information, ACK/NACK response, and/or system information.

In step 830, the first portion of data is encoded to generate first encoded data. Similarly, the second portion of the data is encoded to generate second encoded data. The encoded data is then modulated in step 840 to generate modulated data.

In step 850, the modulated data, along with the first and second reference symbols, are transmitted in the resource block to a communication device 504.

According to particular embodiments of the present invention, a base station 502, such as the device diagrammed in FIG. 7, is operable in a communications network and includes a transceiver 704 and data processing resources 708, which together are configured to transmit data in a resource block as detailed in the flow chart of FIG. 8.

Figure 10:
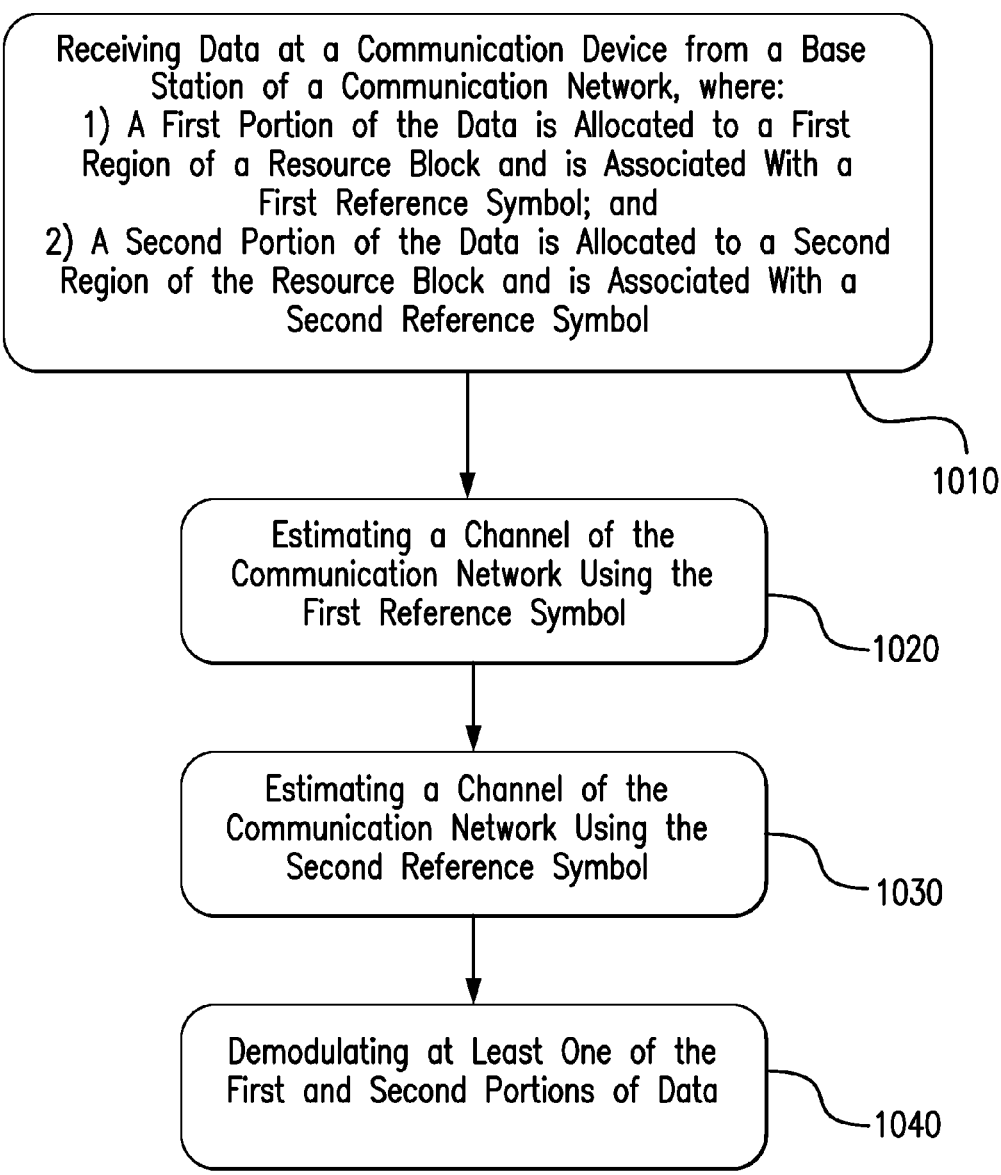
FIG. 10 is a flow chart illustrating a process for demodulating data in accordance with exemplary embodiments of the present invention.

Referring to FIG. 10, a flow chart 1000 illustrating a process for demodulating data received in a resource block by a communication device 504 is shown.

In step 1010, the communication device 504 receives data from a base station 502 of a communication network. The base station may be, for example, an eNB as diagrammed in FIG. 7.

A first portion of the data is allocated to a first region of the received resource block, such as resource block 400 illustrated in FIG. 4. A second portion of the data is allocated to a second region of the resource block 400. Each of the regions is associated with a first and second reference symbol, respectively.

In step 1020, the communication device estimates a channel of the communication network using the first reference symbol. Similarly, in step 1030, the communication device estimates a channel of the communication network using the second antenna port In step 1040, at least one of the first and second data is demodulated. The step may further include performing de-rate-matching and decoding on the demodulated data.

According to particular embodiments of the present invention, a UE communication device 504, such as the device diagrammed in FIG. 6, includes an antenna array 602, a transceiver 604, and data processing resources 606, which together, are configured to demodulate data received in a resource block as detailed in the flow chart of FIG. 10.

According to particular embodiments of the present invention, in a RB used for control channel transmission, a plurality of orthogonal time-frequency and code resources may be defined. A partition, referred to herein as a resource, may be defined as a region consisting of a subset of resource elements in the RB plus a cover code. The cover code may be selected, for instance, from a set of orthogonal cover codes. According to particular embodiments of the present invention, each resource is associated with one or more unique reference symbols, where the resource elements carrying the associated reference symbols are also transmitted in the same resource block or RB pair. When a UE demodulates the information in a given resource of the transmitted RB, it can use the RS associated with that resource for processing. For instance, the RS can be used for accurate channel estimation. Furthermore, each resource within the RB can be independently assigned to one or more UEs.

In certain aspects, within each resource, control information is transmitted including (but not limited to) a CCE, which belongs for example to a PDCCH, a PHICH, or a PBCH. If the resource is too small to fit a whole CCE, PHICH, or PBCH, a fraction of these messages can be transmitted in a first resource and the other fractions in another resource, for instance, elsewhere in the same sub-frame. The other resource could be associated with other reference symbols.

FIGS. 9 and 11-13 illustrate exemplary partitioning of a resource block into regions along with the association of the regions to reference symbols. The use of an RB to illustrate embodiments in this disclosure may straightforwardly be extended to an RB pair if, for instance, data is mapped to both slots in a sub-frame. According to particular embodiments of the present invention, the partitioning of resources can be performed based on frequency division multiplexing (FDM), as well as time division multiplexing (TDM) and code division multiplexing (CDM).

Figure 9:
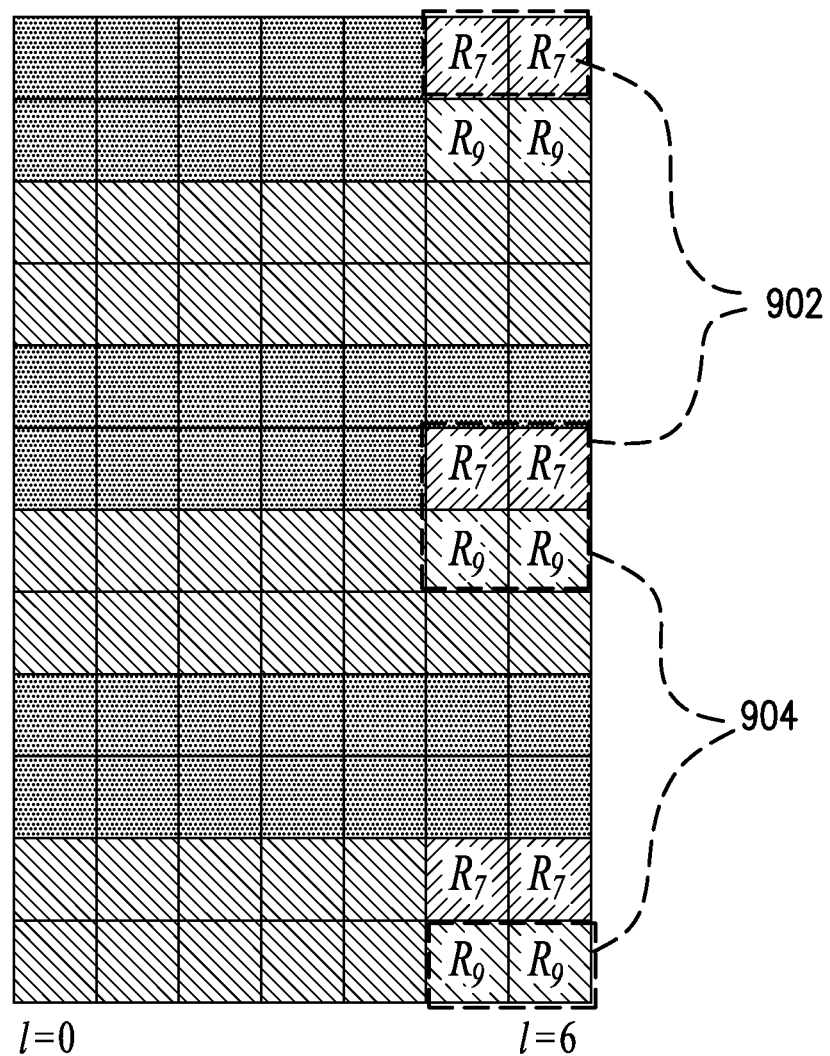
FIG. 9 illustrates a resource block with regions and associated reference symbols in accordance with exemplary embodiments of the present invention.

FIG. 9 shows an exemplary RB with the reference symbol positions for up to four transmission ports, as defined currently in LTE. The resource elements carrying the reference symbols are denoted by $R_7$ and $R_9$. The REs denoted by $R_7$ can contain the RS for antenna port 7, or alternatively for antenna ports 7 and 8, if both ports are used. The RS for the two ports may be overlaid on top of each other in a plurality of overlapping resource elements using orthogonal cover codes (OCC). For example, in each pair of adjacent symbols 902 shown in FIG. 9, the transmitted RS for port 7 may be {+1, +1} and for port 8 may be {+1, −1}. According to particular embodiments of the present invention, the RS for antenna ports 9 and 10 are similarly overlaid on the adjacent RE pairs 904 shown in FIG. 9.

FIG. 9 also shows two distinct regions for control message transmission within the RB. In this embodiment, each region has 36 REs, which is the same as the number of REs in a CCE on the legacy LTE carrier. The first region, illustrated with dots, is associated with antenna port 7 or antenna ports 7 and 8, whereas the second region, illustrated with hashing, is associated with port 9 or ports 9 and 10.

According to particular embodiments of the present invention, a reference symbol is not necessarily transmitted in each RB transmission. For instance, an RS for a resource does not need to be transmitted when the corresponding region is not used. This allows, for example, for the use of UE allocations and search spaces (locations where the UE performs blind decoding to search for messages addressed to it) that are defined in terms of CCEs for the legacy PDCCH, to be carried over to the control channel based on UE-specific RS. The only necessary change in existing schemes is the mapping of the CCEs to REs.

Figure 11:
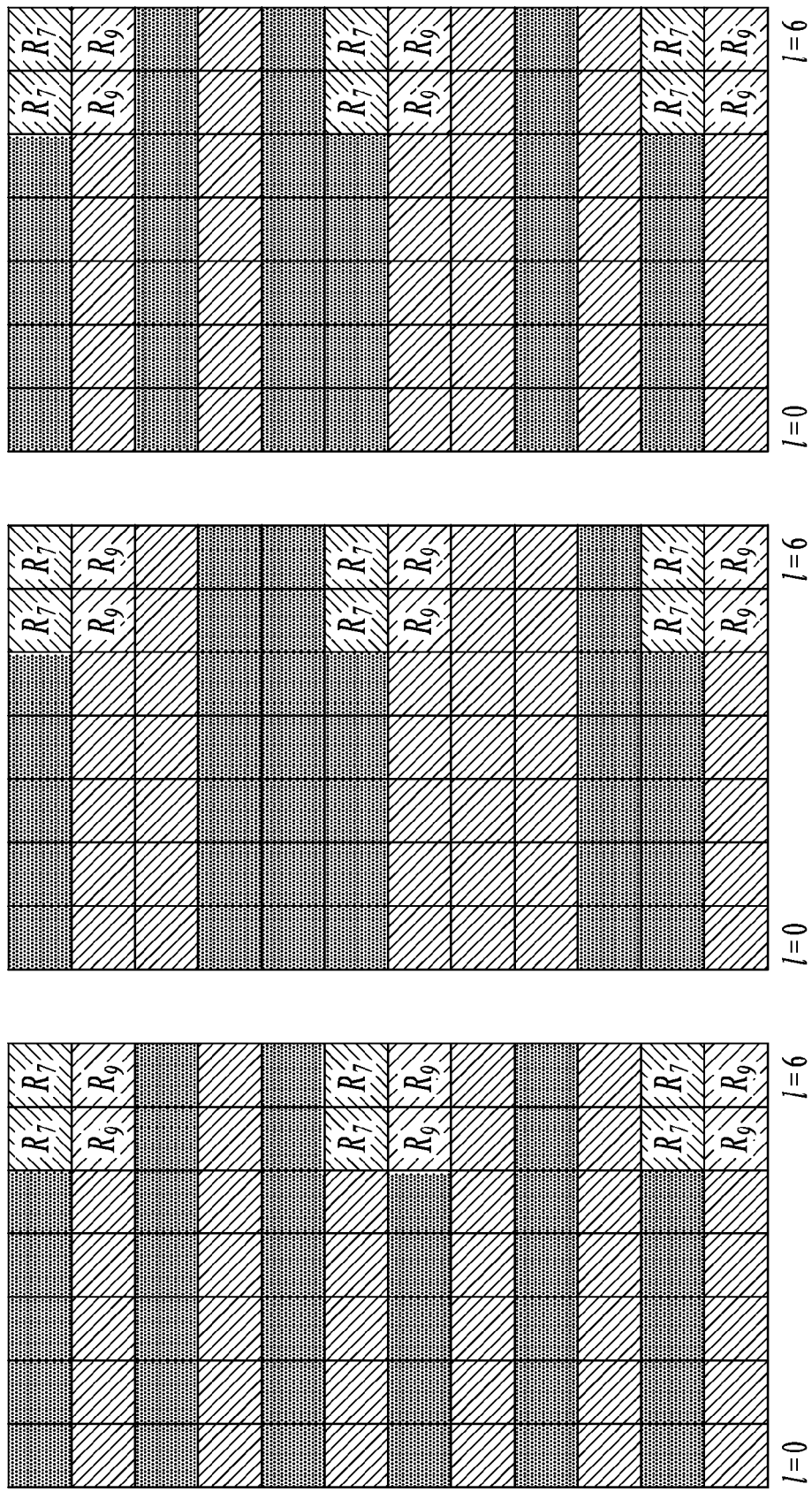
FIG. 11 illustrates exemplary resource blocks with regions and associated reference symbols in accordance with exemplary embodiments of the present invention.

In particular embodiments of the present invention, the partitioning of resources within an RB or RB pair into multiple, non-overlapping regions with associated unique RS may be implemented in various ways, for instance, as provided in FIG. 11. In the examples of FIG. 11, a first region is illustrated with dots and associated with antenna port 7 or antenna ports 7 and 8, while a second region is illustrated with hashing and associated with port 9 or ports 9 and 10.

Figure 12:
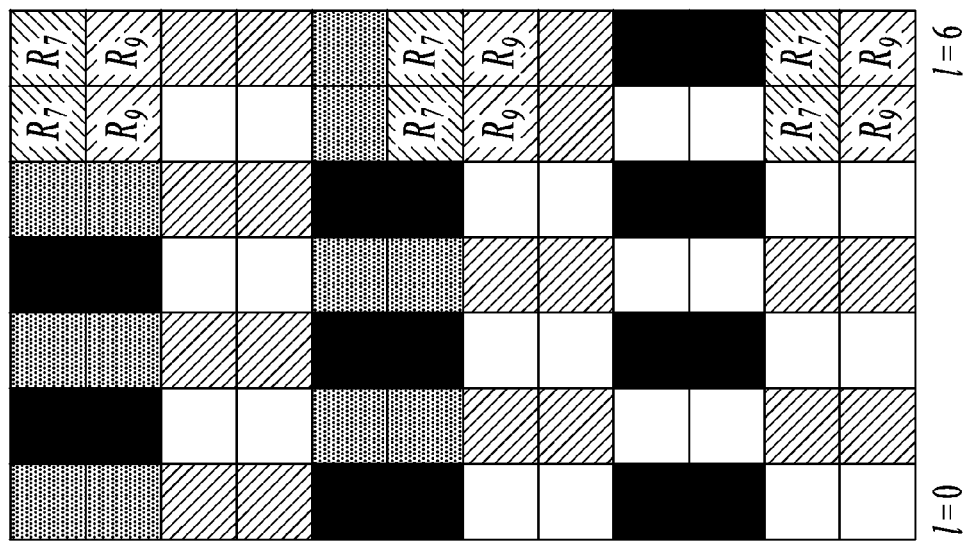
FIG. 12 illustrates exemplary resource blocks with four regions and associated reference symbols in accordance with exemplary embodiments of the present invention.
Figure 12:
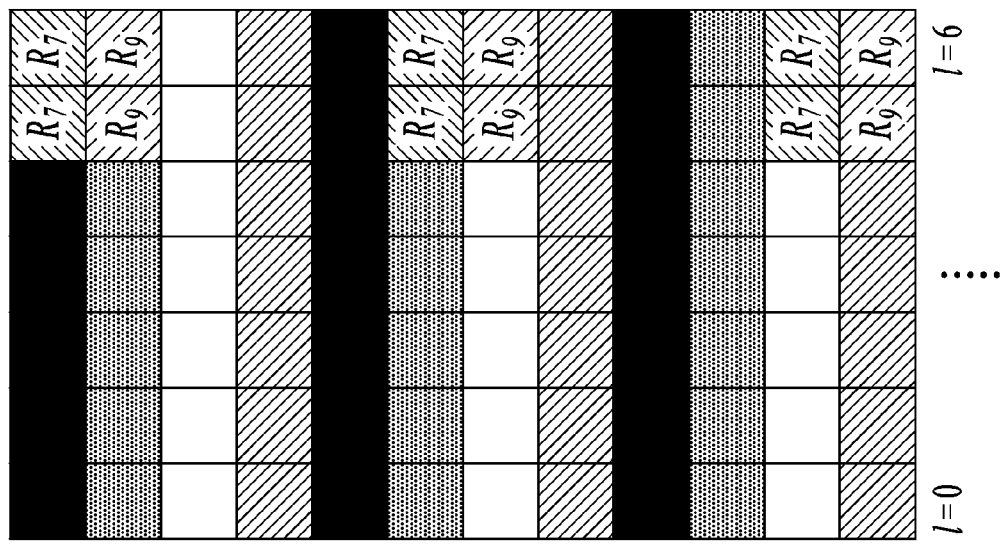

A further example, shown in FIG. 12, illustrates two possible configurations with RBs that have been partitioned into four regions. According to this example, no cover codes for the information are required. Thus, the region illustrated with dots is associated with antenna port 7, the region illustrated with black blocks is associated with antenna port 8, the region illustrated with hashing is associated with antenna port 9, and the region illustrated with white blocks is associated with antenna port 10. As previously described, the RS for antenna ports 8 and 10 may be transmitted using orthogonal cover codes in the same REs that are used by ports 7 and 9, respectively.

Code division multiplexing (CDM) may be incorporated into a partitioning scheme to create additional associations between resources and reference symbols. For instance, two cover codes, such as {+1,+1} and {+1,−1}, could be applied to a region, e.g., the region illustrated with dots in FIGS. 9 and 11. In this example, the region illustrated with dots with cover code {+1,+1} could be associated with antenna port 7 and the region illustrated with dots with cover code {+1,−1} could be associated with antenna port 8. Similarly, the region illustrated with hashing shown in FIGS. 9 and 11, using cover code {+1,+1}, could be associated with antenna port 9 while the region illustrated with hashing with cover code {+1,−1} could be associated with antenna port 10. This approach can provide an alternative to the implementation using four-region partitioning and RS association shown in FIG. 12.

Figure 13:
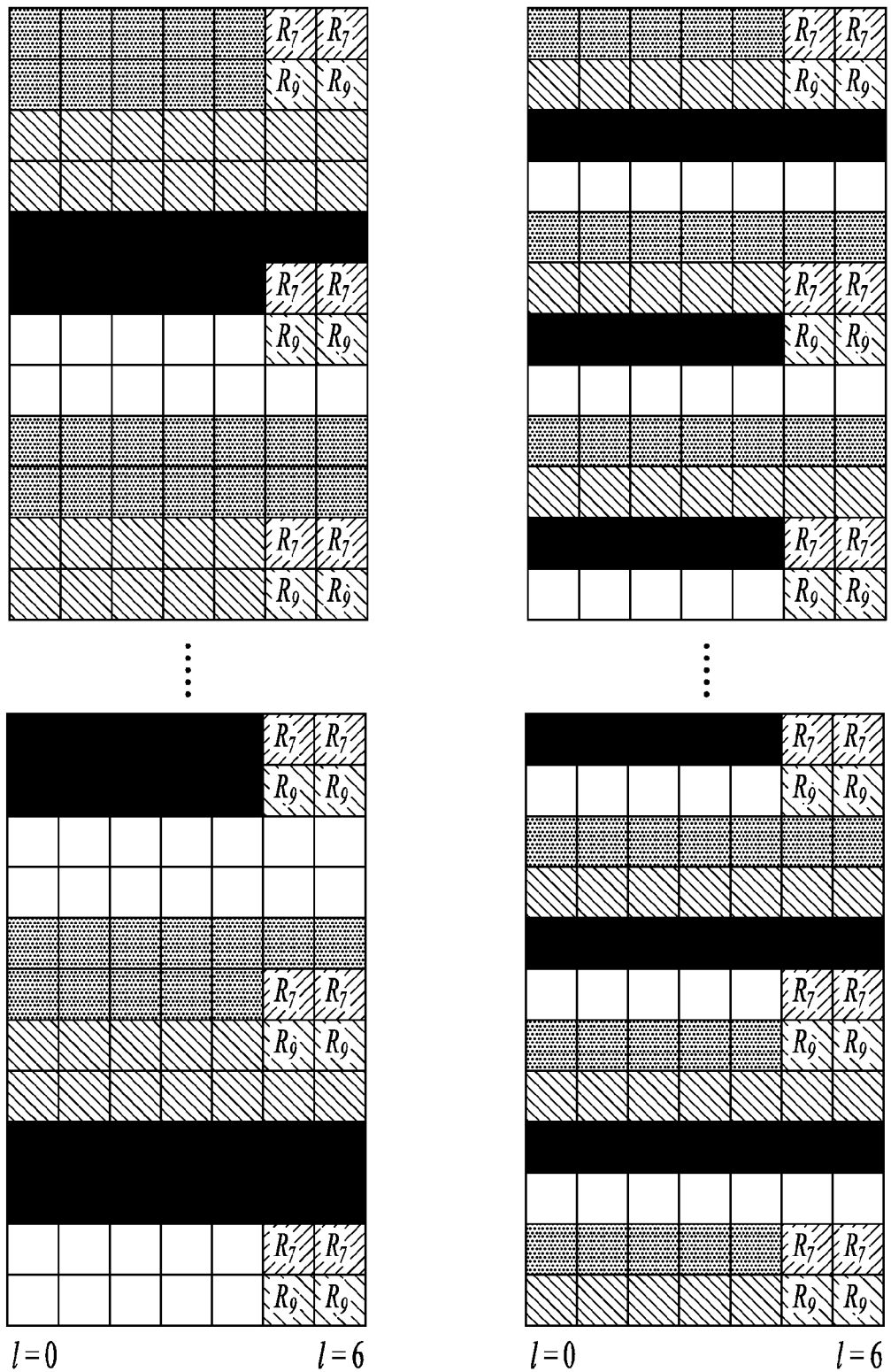
FIG. 13 illustrates exemplary resource blocks with regions and associated reference symbols in accordance with exemplary embodiments of the present invention.

According to certain embodiments, a plurality of RBs may be used together for defining region partitions and RS associations in order to embed frequency diversity into the region transmission. For instance, as shown in FIG. 13, four regions and their associated reference symbols and antenna ports are defined using resource elements within two RBs. In this embodiment, the two RBs have frequency separation. The region illustrated with dots is associated with antenna port 7. The region illustrated with hashing is associated with antenna port 9. The region illustrated with black blocks is associated with antenna port 8. The region illustrated with white blocks is associated with antenna port 10.

According to certain embodiments of the present invention, when a message, such as control message, is small, the message may be split and distributed over multiple regions, where each region is transmitted in a RB separated with sufficiently large frequency separation as to provide frequency diversity. Exemplary small control messages may include a PDCCH with a single CCE, or a PHICH.

Figure 14:
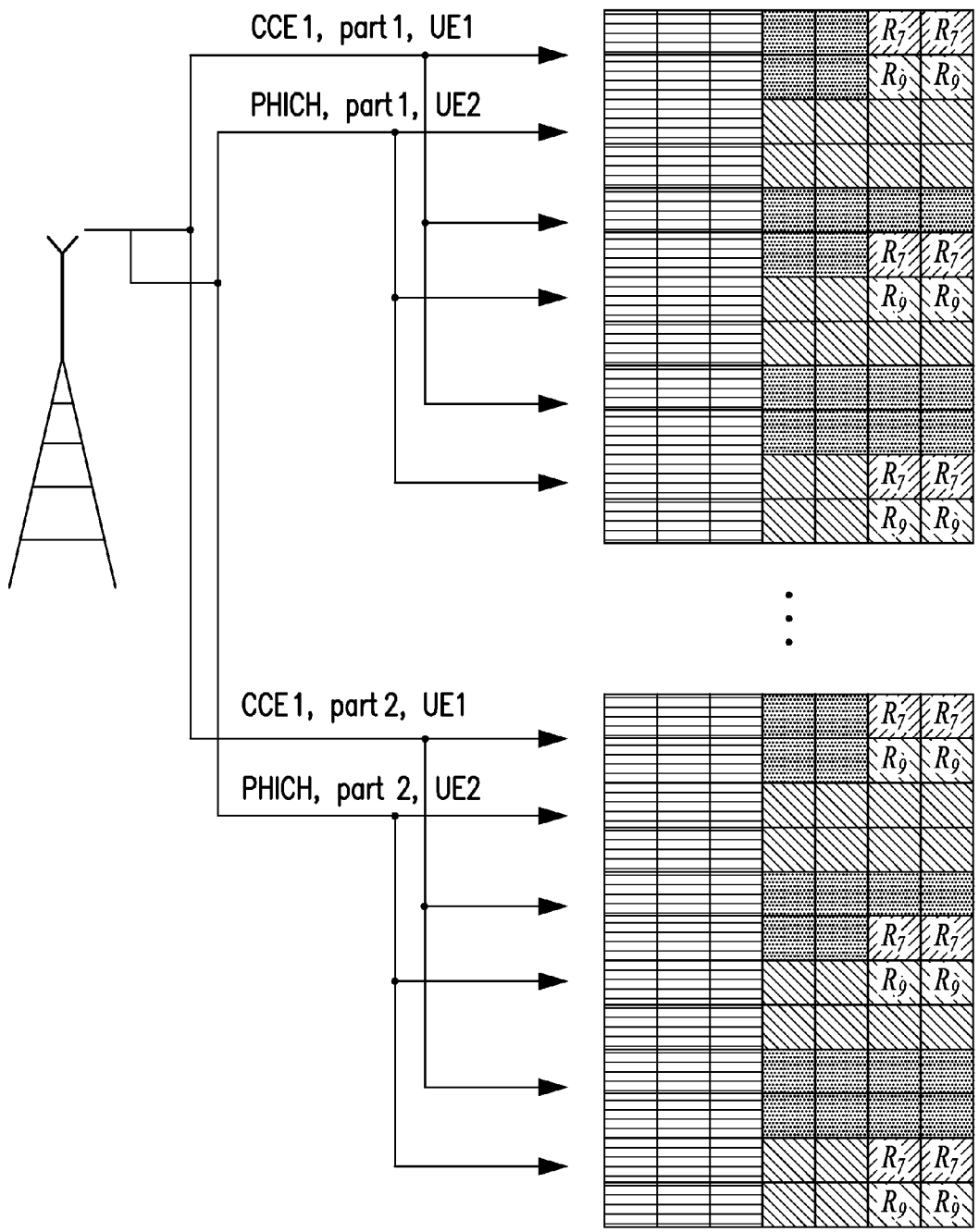
FIG. 14 illustrates exemplary resource blocks with regions and associated reference symbols for transmission of small messages in accordance with exemplary embodiments of the present invention.

As discussed above, different orthogonal resources within a RB can be utilized by different PDCCHs. A PHICH can also share radio resources with other PDCCHs. This example is illustrated in FIG. 14, where UE 1 receives a PDCCH consisting of a single CCE and UE 2 receives a PHICH.

Figure 1:
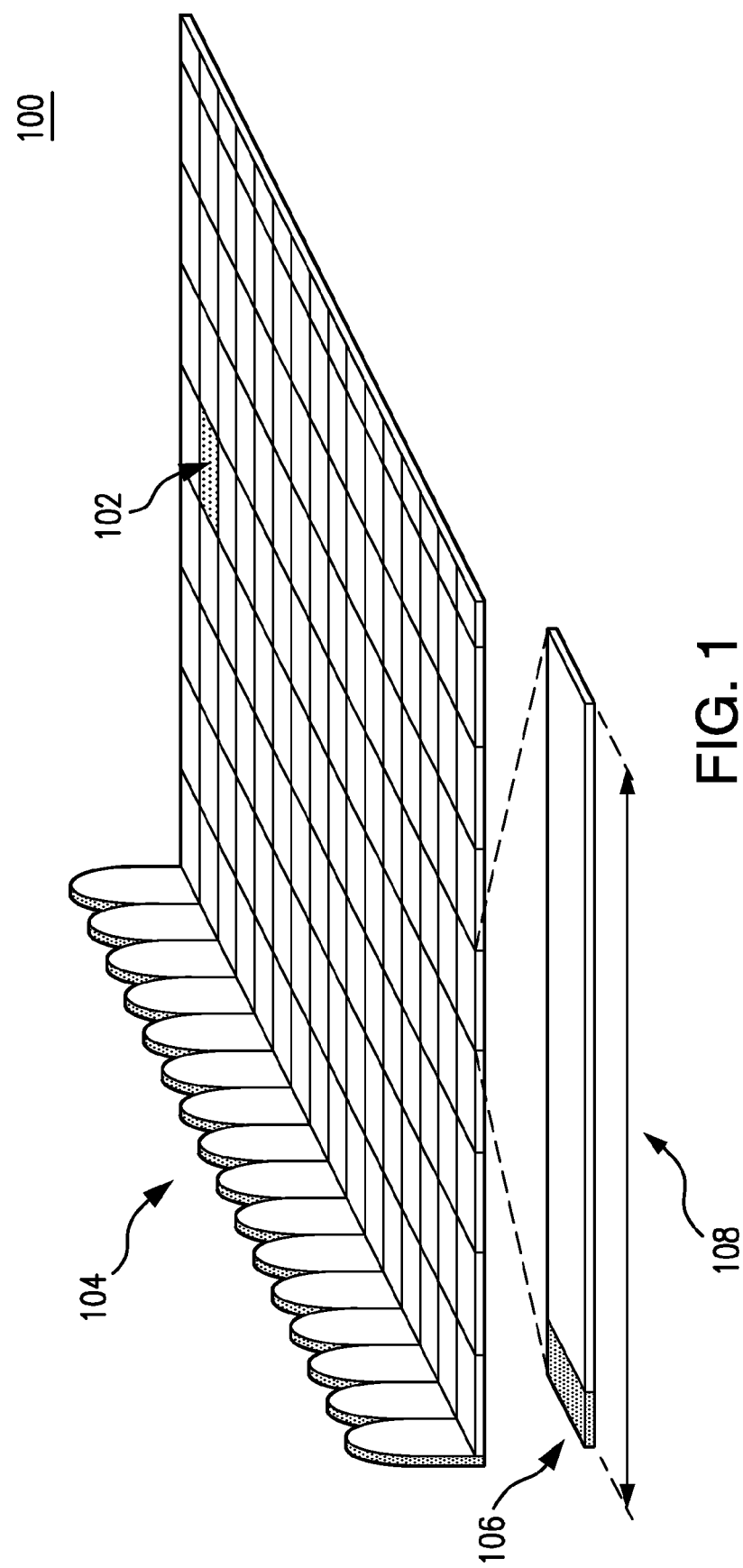
FIG. 1 illustrates an exemplary resource block.
Figure 2:
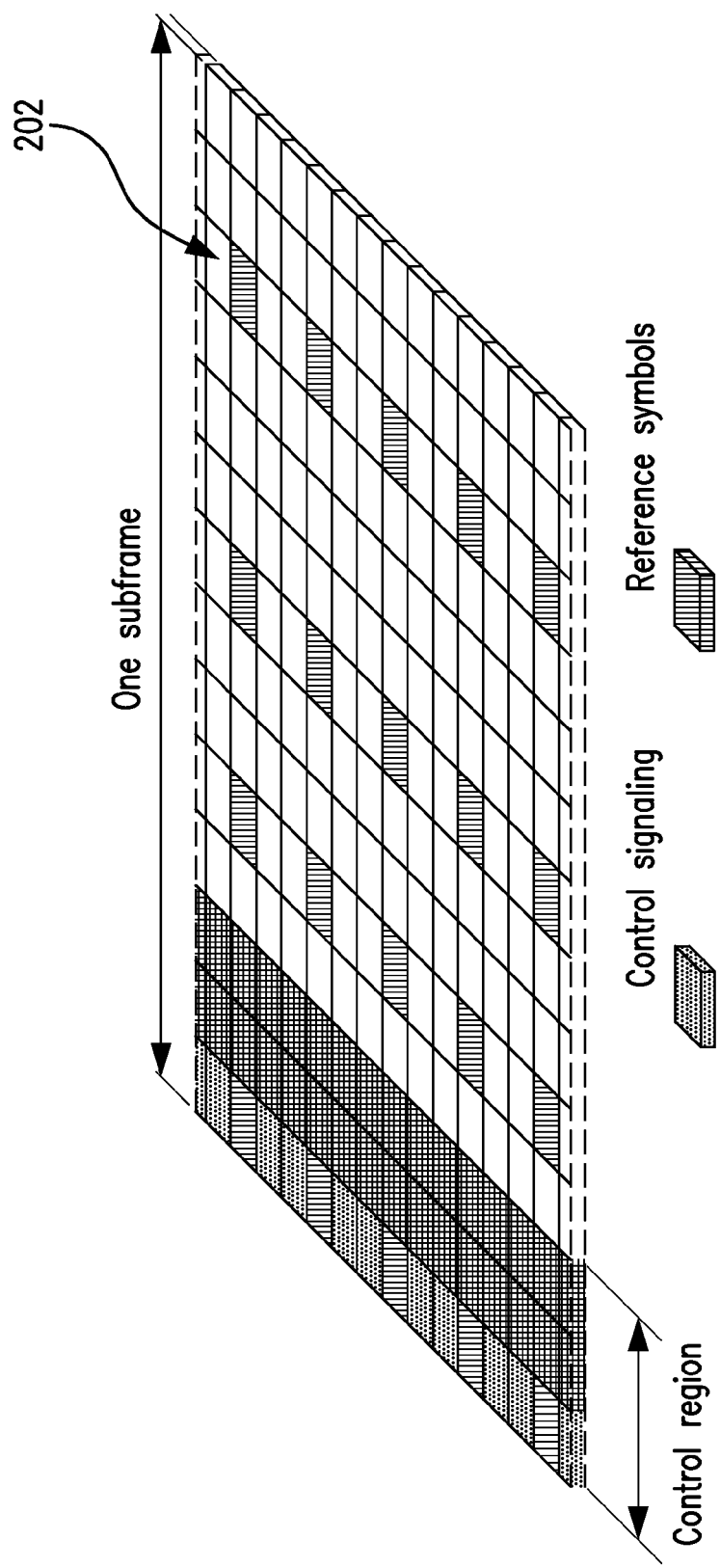
FIG. 2 illustrates an exemplary downlink sub-frame.
Figure 3:
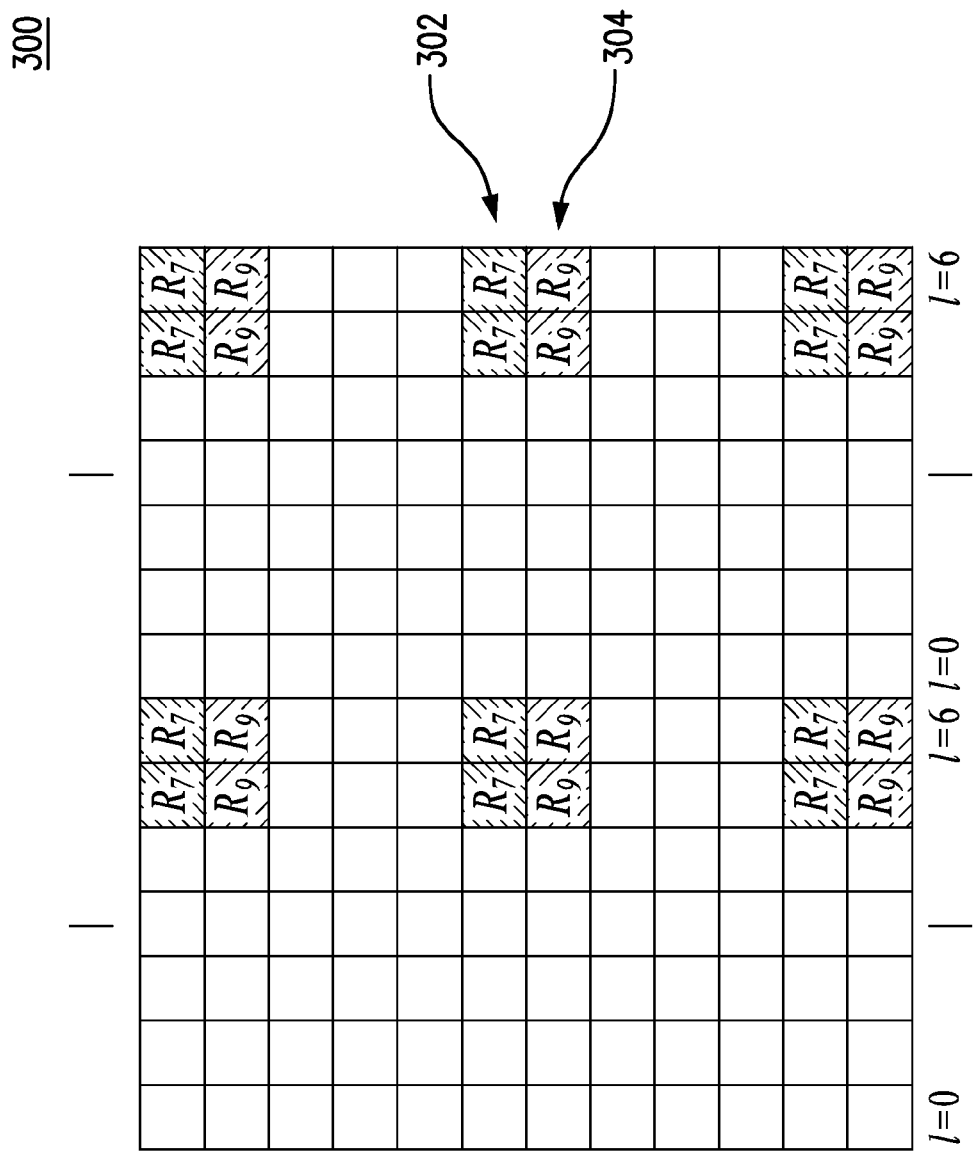
FIG. 3 illustrates a resource block pair with UE-specific reference symbols.

The described solutions can be applied to a new carrier type, where all sub-carriers in an RB can be utilized according to the above teachings. However, in a carrier that is backward compatible to existing LTE system specifications, the initial, for instance first one to four depending on the configuration, OFDM symbols in a sub-frame may be reserved for control information. This is shown, for instance, in the allocation illustrated in FIG. 2. To enable support of legacy UEs within a cell, the embodiments described above can be applied to the radio resources not allocated to the legacy control region. For instance, as shown in FIG. 14, where the described solutions are applied to the final four OFDM symbols (after the first three for legacy operations) in the first slot of a sub-frame.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for transmitting data in a resource block from a base station to a first user equipment (UE) communication device, the resource block including a plurality of regions that comprise resource elements, comprising:

allocating a first portion of said data to a first region of said plurality of regions, wherein said first portion of said data is associated with a first reference symbol, wherein the first reference symbol is uniquely associated with said first UE communication device and is in a first signal region that is adjacent to the first region, and wherein the first signal region and the first region are within the resource block which is located within a sub-frame;

allocating a second portion of said data to a second region of said plurality of regions, wherein said second portion of said data is associated with a second reference symbol, wherein the second reference symbol is not associated with said first UE communication device and is associated with a second UE communication device and is in a second signal region that is adjacent to the first signal region, and wherein the second signal region and the second region are within the resource block which is located within the sub-frame;

allocating a third portion of said data to said first region, wherein said third portion of said data is associated with a third reference symbol;

applying orthogonal cover codes to said first and third reference symbols, wherein said first and third reference symbols are allocated to an overlapping plurality of resource elements of said resource block;

applying orthogonal cover codes to said first and third portions of said data;

encoding said first and second portions of said data to generate first and second encoded data;

modulating said first and second encoded data to generate modulated data; and transmitting said modulated data and said first and second reference symbols in said resource block, to said communication device, wherein the first reference symbol is a UE-specific reference symbol that is used to demodulate a control message in the first portion of said data, wherein the second reference symbol is a UE-specific reference symbol that is used to demodulate another control message in the second portion of said data.

2. The method of claim 1, wherein said control message includes commands related to one or more of power control, scheduling information, ACK/NACK response and system information.

3. The method of claim 1, wherein said resource block is comprised of a plurality of orthogonal frequency division multiplexed (OFDM) symbols, and further comprising:

allocating a control message to a subset of said OFDM symbols to form a third region.

4. The method of claim 1, wherein the first region transmits fractions of control information, wherein the control information is at least one of CCE, PHICH, and PBCH.

5. The method of claim 1, wherein the resource block includes a plurality of orthogonal like-frequency and code resources.

6. The method of claim 1, wherein the first reference symbol is not transmitted when the first region is not used.

7. The method of claim 1, wherein the first region includes a subset of resource elements in a resource block and a cover code for a set of orthogonal codes.

8. The method of claim 1, wherein the first reference symbol is used by user equipment to demodulate information associated with the first region and wherein the first region and the second region are independently assigned to different user equipment.

9. The method of claim 1, wherein the first region includes two layers of control information based on the control information separated by a cover code.

10. The method of claim 1, wherein the second signal region is adjacent to the second region.

11. The method of claim 1, wherein each reference symbol is uniquely associated with a resource.

12. The method of claim 1, wherein the second reference symbol is uniquely associated with the second UE.

13. The method of claim 1, wherein said control message includes scheduling information.

14. The method of claim 1, wherein said control message includes commands related to scheduling information or an ACK/NACK response.

15. The method of claim 4, wherein other fractions of the control information are used in other regions.

16. The method of claim 5, wherein a partition includes a region consisting of a subset of resource elements in the resource block plus a cover code, wherein the cover code is selected from orthogonal cover codes.

17. The method of claim 5, wherein the resources are associated with one or more reference symbols, wherein resource elements carrying associated reference symbols are transmitted in a same resource block.

18. A base station device operable in a communication network for transmitting data in a resource block to a first user equipment (UE) communication device, the resource block including a plurality of regions that comprise resource elements, comprising:

a processor configured to:
allocate a first portion of said data to a first region of said plurality of regions, wherein said first portion of said data is associated with a first reference symbol, wherein the first reference symbol is uniquely associated with said first UE communication device and is in a first signal region that is adjacent to the first region, and wherein the first signal region and the first region are within the resource block which is located in a sub-frame, allocate a second portion of said data to a second region of said plurality of regions, wherein said second portion of said data is associated with a second reference symbol, wherein the second reference symbol is not associated with said first UE communication device and is associated with a second UE communication device and is in a second signal region that is adjacent to the first signal region, and wherein the second signal region and the second region are within the resource block which is located in the sub-frame, allocate a third portion of said data to a first region of said plurality of regions, wherein said third portion of said data is associated with a third reference symbol, apply orthogonal cover codes to said first and third reference symbols, wherein said first and third reference symbols are allocated to an overlapping plurality of resource elements of said resource block, apply orthogonal cover codes to said first and third portions of said data, encode said first and second portions of said data to generate first and second encoded data, and modulate said first and second encoded data to generate modulated data; and a transmitter configured to transmit said modulated data and said first and second reference symbols in said resource block to a communication device in said communication network, wherein the first reference symbol is a UE-specific reference symbol that is used to demodulate a control message in the first portion of said data, wherein the second reference symbol is a UE-specific reference symbol that is used to demodulate another control message in the second portion of said data.

19. The device of claim 18, wherein said control message includes commands related to one or more of power control, scheduling information, ACK/NACK response and system information.

20. The device of claim 18, wherein said resource block is comprised of a plurality of orthogonal frequency division multiplexed (OFDM) symbols and said processor is further configured to:

allocate a control message to a subset of said OFDM symbols to form a third region.

21. A method for demodulating data in a resource block, which includes a plurality of regions that comprise resource elements, comprising:

receiving said data at a first user equipment (UE) communication device from a base station of a communication network, wherein a first portion of said data is allocated to a first region of said plurality of regions and is associated with a first reference symbol, wherein the first reference symbol is uniquely associated with said first UE communication device and is in a first signal region that is adjacent to the first region, and a second portion of said data is allocated to a second region of said plurality of regions and is associated with a second reference symbol, wherein the second reference symbol is not associated with said first UE communication device and is associated with a second UE communication device and is in a second signal region that is adjacent to the first signal region, wherein a third portion of said data is allocated to said first region, wherein said third portion of said data is associated with a third reference symbol, wherein orthogonal cover codes are applied to said first and third portions of said data that overlap each other, wherein orthogonal cover codes are applied to said first and third portions of said data;

estimating a first channel of said communication network using said first reference symbol;

estimating a second channel of said communication network using said second reference symbol; and demodulating at least one of said first and second portions of said data, wherein a control message in at least one of said first and second portions of said data is demodulated by the first reference symbol which is a UE specific reference symbol, wherein the second reference symbol is a UE-specific reference symbol that is used to demodulate another control message in the second portion of said data.

22. The method of claim 21, wherein said control message includes commands related to one or more of power control, scheduling information, ACK/NACK response and system information.

23. A first user equipment (UE) communication device operable in a communication network to receive data in a resource block, which includes a plurality of regions that comprise resource elements, comprising:

an antenna configured to receive said data; and a processor coupled to said antenna and configured to receive said data from said antenna;

wherein, a first portion of said data is allocated to a first region of said plurality of regions and is associated with a first reference symbol, wherein the first reference symbol is uniquely associated with said first UE communication device and is in a first signal region that is adjacent to the first region, and a second portion of said data is allocated to a second region of said plurality of regions and is associated with a second reference symbol, wherein the second reference symbol is not associated with said first UE communication device and is associated with a second UE communication device and is in a second signal region that is adjacent to the first signal region, wherein a third portion of said data is allocated to said first region, wherein said third portion of said data is associated with a third reference symbol, wherein orthogonal cover codes are applied to said first and third portions of said data that overlap each other, wherein orthogonal cover codes are applied to said first and third portions of said data, and said processor is further configured to:

estimate a first channel of said communication network using said first reference symbol;

estimate a second channel of said communication network using said second reference symbol; and demodulate at least one of said first and second portions of said data, wherein a control message in at least one of said first and second portions of said data is demodulated by the first reference symbol which is a UE specific reference symbol, wherein the second reference symbol is a UE-specific reference symbol that is used to demodulate another control message in the second portion of said data.

24. The device of claim 23, wherein said control message includes commands related to one or more of power control, scheduling information, ACK/NACK response and system information.

25. The device of claim 23, wherein the resource block includes resource elements carrying reference symbols, wherein the resource elements contain resource symbols for one or more antenna ports.

26. The device of claim 25, wherein the resource symbols for the one or more antenna ports are overlaid on top of each other in a plurality of overlapping resource elements using orthogonal cover codes (OCC).

* * * * *